Feb. 23, 1965  W. F. BUSSE  3,170,892
GRAFT POLYMERS WITH POLYSULFONE GRAFTS AND THEIR PREPARATION
Filed April 29, 1960  2 Sheets-Sheet 2
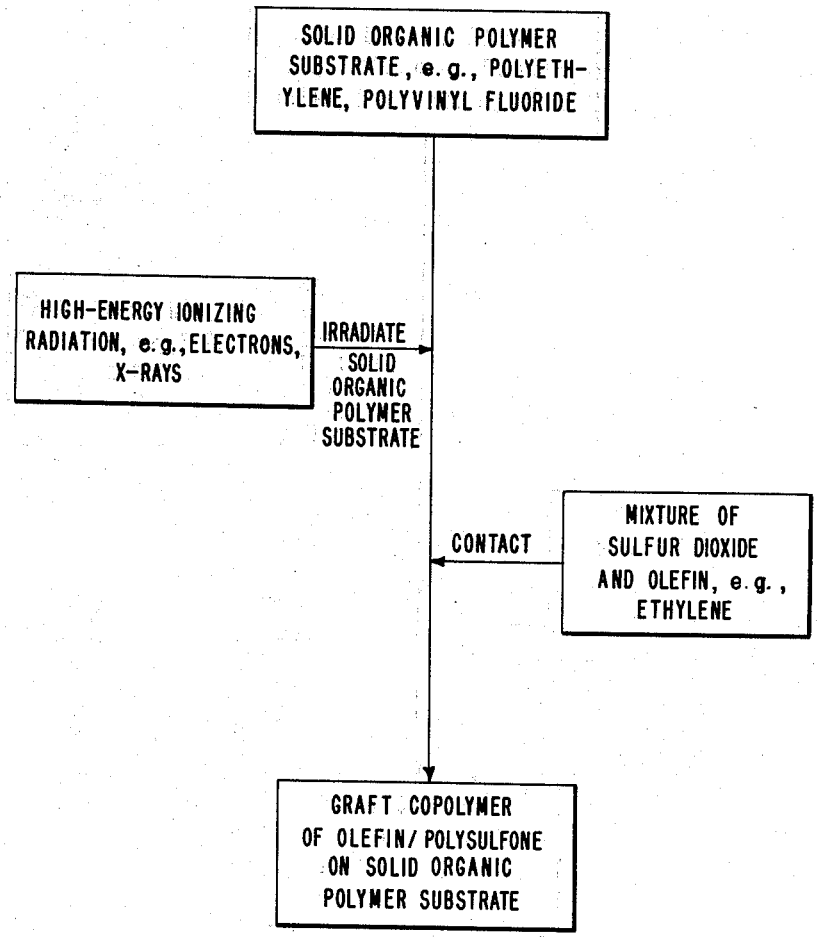
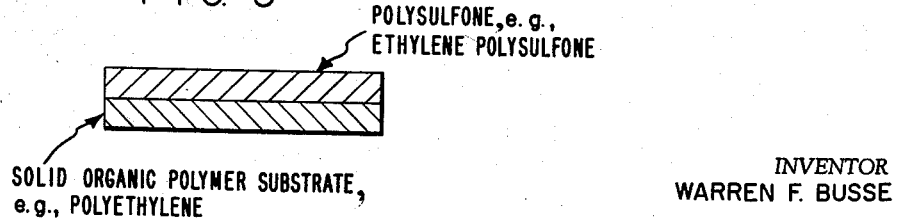
INVENTOR
WARREN F. BUSSE
BY James H. Ryan
ATTORNEY

United States Patent Office 3,170,892
Patented Feb. 23, 1965

3,170,892
GRAFT POLYMERS WITH POLYSULFONE GRAFTS
AND THEIR PREPARATION
Warren F. Busse, Wilmington, Del., assignor to E. I.
du Pont de Nemours and Company, Wilmington, Del.,
a corporation of Delaware
Filed Apr. 29, 1960, Ser. No. 25,503
23 Claims. (Cl. 260—859)

This invention relates to, and has as its principal objects provision of, a novel process for preparing graft copolymers and the copolymers produced thereby.

The process of the invention comprises irradiating a solid organic polymer substrate having a molecular weight of at least 5000 with ionizing radiation either prior to or during contact of the substrate with a mixture of sulfur dioxide and an olefin.

It will be understood that, when the solid polymer substrate is irradiated prior to contact with the olefin/sulfur dioxide mixture, the contacting step must take place while the effect of the irradiation is still active. This may be accomplished by carrying out the contacting step within five minutes, and preferably within one minute, of the completion of the irradiation or by storing the irradiated solid polymer substrate in the essential absence of molecular oxygen and/or at a temperature of 0° C. or below. Storage in the absence of oxygen and/or at low temperature preserves the activity of the irradiated substrate almost indefinitely.

The products of this invention are, of course, the novel graft polymers formed by grafting an olefin/sulfur dioxide polysulfone onto the solid organic polymer substrate.

Both the process and the product aspects of the invention will be understood more fully from the detailed description which follows and from the drawings, really self-evident, wherein:

FIG. 2 represents the second process aspect in which the substrate is first irradiated and then contacted with the olefin/sulfur dioxide mixture; and FIG. 3 is a diagrammatic illustration of a resultant graft copolymer, the definition of the layers perhaps being somewhat exaggerated.

Figure 1:
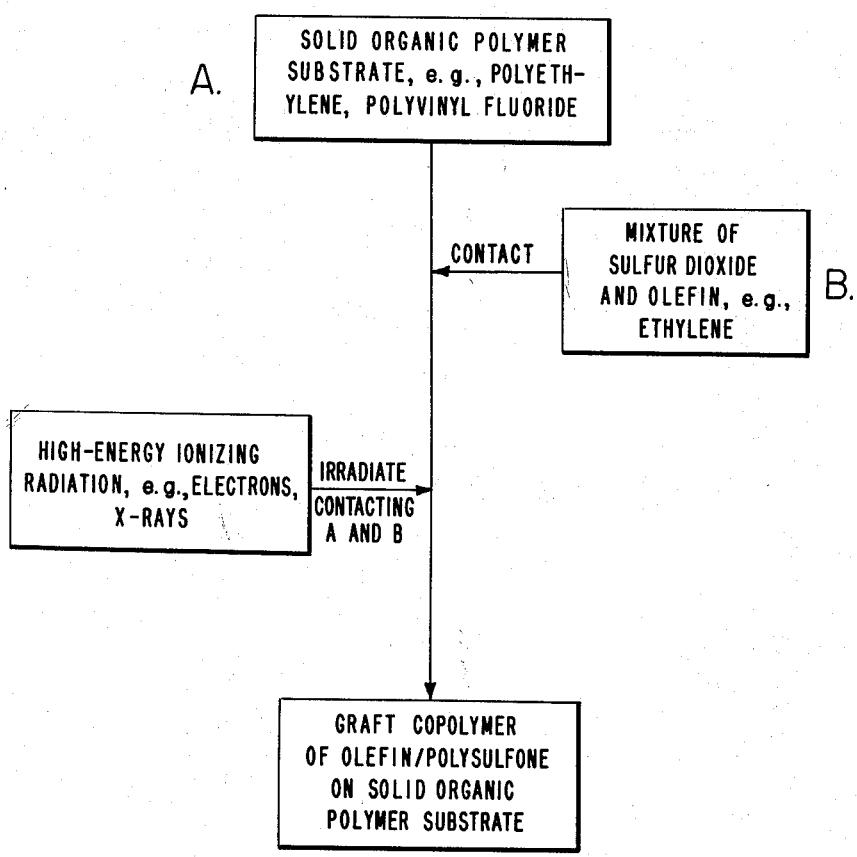
FIG. 1 represents the process aspect of the invention in which irradiation is carried out after contacting the polymer substrate with the olefin/sulfur dioxide mixture.

Organic polymers suitable as substrates in this invention include any normally solid organic polymeric material with a molecular weight of 5000 or greater. The polymers may be linear, branched, isotactic, or atactic and may be oriented or unoriented. Thus, there may be employed hydrocarbon polymers, such as polyethylene, polypropylene, polystyrene, polybutadiene, rubber, polyisobutylene, butadiene/styrene copolymers and the like; halogenated hydrocarbon polymers, such as polyvinyl chloride, polyvinylidene chloride, polychloroprene, polytetrafluoroethylene, polyvinyl fluoride, vinylidene fluoride/hexafluoropropylene copolymers, and the like; ester-containing polymers, such as polyvinyl acetate, polymethyl methacrylate, polyethylene terephthalate, poly(p-hexahydroxylylene terephthalate) and the like; hydroxy-containing polymers, such as polyvinyl alcohol, cellulose, regenerated cellulose, and the like; ether-containing polymers, such as solid polyetrahydrofuran, polyoxymethylene, dioxolane polymers, ethylene oxide polymers, and the like; condensation polymers, such as phenol-formaldehyde polymers, urea-formaldehyde polymers, triazine-formaldehyde polymers, polyamides, polyesters, polyimides, and the like; polyacrylonitrile, polyvinyl acetals, polyureas, polyurethanes, and mixtures of copolymers based on two or more of the above compounds, as well as natural polymers such as cotton, wool, silk, and the like.

Of these organic polymer substrates, a preferred class, because they are highly reactive, are those in which the backbone chain of the substrate material is substantially entirely a chain of carbon atoms and particularly those polymers in which such carbon chains are free of aliphatic carbon-to-carbon unsaturation. Still more preferred because of their exceptional response to the process of this invention are the hydrocarbon polymers of the above group, such as polyethylene, polypropylene, polyisobutylene, polystyrene, and the like. Another preferred class of organic polymer substrates are the polyamides, i.e., the nylons.

Olefins suitable for use in this invention are those known in the art to react with sulfur dioxide to yield olefin/$SO_2$ polysulfones. Thus, there may be employed such olefins as ethylene, propylene, isobutylene, 1-butene, 1-pentene, 2-pentene, 1-octene, 1-nonene, 1-eicosene, cyclohexene, 3-cyclohexyl-1-propene, 3-methylcyclohexene, 4-isopropyl-1-methyl-3-cyclohexene, butadiene, isoprene, 1,4-pentadiene, 1,5-hexadiene, methallyl alcohol, styrene, allyl acetate, o-allylanisole, o-allylphenol, p-bromoallylbenzene, allyl cyanide, allyacetic acid, undecylenyl alcohol, undecylenic acid, methyl undecylenate, and the like.

A preferred class of olefins for use in this invention are those of the formula

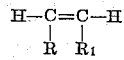

where R may be hydrogen, methyl, or hydroxymethyl, R' may be hydrogen or an alkyl group with up to 18 carbon atoms, and R and R', taken together, may be a saturated hydrocarbon diradical having from one to four carbon atoms in the chain and containing up to seven carbon atoms. A particularly preferred group are the lower 1-alkenes.

Suitable ionizing radiations for use in preparing the graft copolymers of this invention include both radiation in the form sometimes regarded as particle radiation and radiation in the form sometimes regarded as ionizing electro-magnetic radiation.

By particle radiation is meant a stream of particles such as electrons, protons, neutrons, alpha-particles, deuterons, beta-particles, or the like, so directed that the said particles impinge upon the organic polymer substrate. The charged particles may be accelerated by means of a suitable voltage gradient, using such devices as a cathode-ray tube, resonant cavity accelerator, a Van de Graaff accelerator, a Cockcroft-Walton accelerator, or the like, as is well known to those skilled in the art. Neutron radiation may be produced by suitable nuclear reactions, e.g., bombardment of a beryllium target with deuterons or alpha-particles. In addition, particle radiation suitable for carrying out the process of this invention may be obtained from an atomic pile or from radioactive isotopes or from other natural or artificial radioactive materials.

By ionizing electromagnetic radiation is meant radiation of the type produced when a metal target (e.g., gold or tungsten) is bombarded by electrons possessing appropriate energy. Such radiation is conventionally termed X-ray. In addition to X-rays produced as indicated above, photons of ionizing electromagnetic radiation suitable for carrying out the process of the invention may be obtained from a nuclear reactor ("pile") or from natural or artificial radioactive material. In all of these latter cases the radiation is conventionally termed gamma rays.

It is recognized that the energy characteristics of one form of ionizing radiation can be expressed in terms which are appropriate for another form. Thus, one may express the energy of either the particles of radiation commonly considered as particle radiation or of the photons of radiation commonly considered as wave or electromagnetic radiation in electron volts (ev.) or million electron volts (mev.). In the irradiation process of this invention, radiation consisting of particles or photons having an energy of 100 ev. and over may be employed and particles or photons having an energy of 0.001 mev. and over are preferred. With radiation of this type, the graft copolymers of this invention can be obtained with a minimum length of exposure to the radiation, permitting maximum efficiency in utilization of the radiation. Particles or photons with an energy equivalent up to 4 mev. are the most useful from a practical standpoint, although radiation with energies of 10 mev. and higher may be employed.

Using a minimum radiation dosage of at least 100 rads is necessary since lower dosages do not give useful amounts of grafting. Dosages as high as $10^8 \times 10^9$ rads and over may be employed, although dosages in excess of $10^{10}$ rads are generally to be avoided since they tend to degrade the polymer substrate. Maximum modification is generally obtained at 10–20 M rads, and 0.1–1 M rads frequently give useful degrees of modification. The exposure may be carried out in one slow pass or in several faster ones and may be conducted at any convenient rate of energy input. One rad is the quantity of radiation which will result in an absorption of 100 ergs. per gram of irradiated material.

The process of this invention may be carried out over a wide range of temperatures. There is no known lower temperature limit, temperatures of −78° to −175° C. and below being operable. The operable higher temperatures are limited only by the decomposition temperature of the reactants or products, wherever is lower. In general, temperatures of 300° C. and below are preferred. These temperature considerations apply to the radiation step and also to the contacting step when this is subsequent to the radiation step.

In a preferred embodiment of the process of the invention, the reaction is carried out in two steps, irradiation being done in the range of −78 to +50° C. (preferably about 0° C.) and the grafting step being subsequently carried out in the range of 0 to 150° C. (preferably 0–25° C.) over a period of about 10–60 minutes and under 100 to 600 lbs. of olefin pressure.

As illustrated in the examples, pressure is not a critical factor in this invention, atmospheric pressure as well as pressures far above and below atmospheric pressure being suitable. In systems having a gaseous phase, for example where the olefin is a gas, the amount of grafting increases with increased pressure.

The mole ratio of olefin/sulfur dioxide for use in the invention is likewise not critical. For consumption of all these materials in the formation of a polysulfone chemically bonded to the substrate the molar ratio is generally 1/1. Departure from this ratio usually results in nonutilization of one of the ingredients of the mixture. Ratios in the range 20/1 to 1/20 will generally be employed. Ratios outside this range are usable, particularly where a liquid phase is involved, e.g., where the mixture consists of an olefin dissolved in liquid sulfur dioxide.

Because of the generally intractable nature of the olefin/sulfur dioxide polysulfones, applications for them have been greatly limited and their incorporation into other polymers has been restricted. By this invention, advantage is taken of this intractability and it is possible to prepare graft copolymers, especially from ethylene polysulfone, which are substantially tougher, stiffer, and higher softening than the substrate polymer starting material. Once the grafting step of this invention is initiated, particularly when oxygen is carefully excluded, it may be allowed to continue for long periods of time, and products weighing many times the weight of the original substrate may be obtained. Large weight gains are accompanied by corresponding linear growth of the substrate. The process of the invention is particularly applicable to substrates which have at least one initial dimension less than 0.05 inch since with these substrates grafting occurs rapidly and uniformly throughout the polymer and the resulting growth is accomplished with minimum distortion of the shape of the substrate. Thus, the process is particularly adaptable to substrates in the form of films, fibers and foams.

As indicated in the examples, the process of the invention may be carried out in the absence of any added reaction medium. It may also be carried out in the presence of inert liquids, such as water, benzene, hexane, carbon disulfide, diethyl ether, dimethoxyethane, tetrahydrofuran, dioxane, and the like. Preferred media are those in which sulfur dioxide and olefin are most soluble. The use of an inert liquid medium is particularly adaptable to the variation of the process in which the substrate is first irradiated (e.g., in the absence of any liquid phase) and then contacted with the olefin/sulfur dioxide mixture.

In the process of this invention, improved weight gains are obtained when the degree of crystallinity of the substrate is increased, for example by annealing treatments prior to irradiation.

As noted above, high weight gains are obtained by operating in the absence of air. However, small amounts of oxygen, of the order of one part per million, are occasionally advantageous in preventing the formation of ungrafted olefin polysulfone. Improved weight gains are also obtained by carrying out the grafting step with the substrate submerged in liquid sulfur dioxide which contains the olefin either in solution or in dispersion.

In the grafting of ethylene polysulfone to polyethylene, tensile strength and modulus increase and elongation decreases with increasing weight gain. At intermediate weight gains (20–200%), the grafted products may be cold drawn and heat set to yield grafted products of greatly increased tensile strength and stiffness which do not lose orientation when immersed in boiling water.

When the substrate polymer is oriented prior to irradiation and grafting with an olefin polysufone, the resulting grafted product retains some of the orientation and possesses some of the advantages of an oriented product.

While the process of this invention generally yields products in which the olefin polysulfone is uniformly grafted throughout the substrate, it is possible to prepare products in which surface grafting predominates by increasing the cross section of the substrate or by restricting the duration of contact between the substrate and the olefin/sulfur dioxide mixture.

A particular advantage of the present invention is that it permits the incorporation of less expensive materials, especially sulfur dioxide, into the structure of expensive polymer substrates without sacrificing the desirable properties of the substrate, and often with accompanying improvement in such properties.

The products of this invention are graft copolymers of organic polymers with olefin polysulfones. The organic polymers are preformed solids to which the grafted olefin polysufone is chemically bonded. In the grafted polysulfone side chains, units from the olefin and sulfur dioxide appear in substantially regular alternation, the sulfone units being catenarian members of the side chain.

The products of this invention are true graft copolymers. This can be illustrated by the properties of polyethylene containing grafted ethylene polysulfone which is a representative product. The X-ray diffraction pattern of this graft copolymer shows lines characteristic of polyethylene and ethylene polysulfone. The graft copolymer in film form is clear and strong; whereas, the most carefully blended mixtures of polyethylene and ethylene polysulfone (prepared independently) give films which are weak, brittle, and opaque. The graft polymer is readily dyed to heavy shades with acetate dyes which do not dye polyethylene or ethylene polysulfone when treated separately. Examination of the graft copolymer by phase contrast microscopically reveals no detail.

Many of the graft copolymers of this invention, particularly those in which the grafted olefin polysulfone represents 50% or less of the total weight of the graft copolymer, are thermoplastic and can be post-formed by molding and extrusion. Such operations are generally more difficult to accomplish and require higher temperatures than similar operations on the ungrafted substrate.

The products of this invention containing grafted ethylene polysulfone are particularly characterized by their improved resistance to sudden heat effects, as in contact with hot cigarette ashes, over the corresponding resistance of the substrate starting material.

In the following examples parts are by weight unless otherwise specified.

EXAMPLE I

Two pieces of polyethylene film are sealed into separate polyethylene bags containing a 3/1 volume mixture of ethylene/$SO_2$. The bags and contents are irradiated at room temperature with 2 mev. electrons from a Van de Graaff generator at a dosage rate of approximately one megarad/second, with successive doses applied at about one-minute intervals. After one megarad of irradiation, the sample films are observed to be cloudy. After three megarads of irradiation, the first film is removed from the irradiation, the second film being irradiated for a total dosage of 10 megarads. The bags are then opened and the resulting graft copolymers of ethylene polysulfone on polyethylene are examined. Thus surface of the first film shows a lower coefficient of friction than the unmodified polyethylene film starting material. Infrared absorption tests on the second film show bands at 2.95, 8.6, and 9.65 microns which are not found in unmodified ethylene polysulfone.

EXAMPLE II

A scoured swatch of taffeta fabric prepared from 40 denier, 34 filament polyhexamethyleneadipamide yarn is laid in contact with a bed of solid carbon dioxide and irradiated with 2 mev. electrons as in Example I for a dosage of 25 megarads within 25 minutes. The chilled fabric is then dropped into a pressure reactor which is cooled at −78° C. and has been purged with nitrogen. About one part of ethyl acetate is added. The reactor is closed and purged again with nitrogen. Ethylene (218 parts) and sulfur dioxide (20 parts) are distilled into the reactor. It is then sealed and allowed to stand for ten hours at 30° C. The pressure is 900 lb./sq. in. The fabric is then removed, extracted with water in a Soxhlet extractor for 24 hours, and then dried. The resulting graft copolymer fabric shows a weight gain of 13.7% over the weight of the ungrafted fabric.

EXAMPLE III

A film of low density polyethylene is placed in a glass container having a wall thickness about one mm. The container is evacuated, sealed, and irradiated at −78° C. with 2 mev. electrons from a Van de Graaff accelerator, being passed 40 times under the electron beam within a period of 40 minutes for an exposure of 500 watt-sec./cm.$^2$ (50 M rads). The container is then connected to a reservoir containing a 1/1 molar mixture of ethylene and sulfur dioxide at atmospheric pressure. The polyethylene film is allowed to stand for 20 hours at 25° C. in contact with this mixture. The resulting graft copolymer film shows a weight gain of 19%. It is clear and tough, and exhibits improved adhesion for a printing ink commercially used for printing polyethylene.

EXAMPLE IV

A film of low density polyethylene, 0.0015 in. thick and weighing 28 parts, is wrapped in aluminum foil one mil thick and irradiated at −78° C. with 2 mev. electrons to a calculated dosage of 25 M rads. The film is kept at −78° C. while it is unwrapped and placed within 1-5 seconds in a pressure vessel that is chilled at −78° C., swept with nitrogen, and contains 1000 parts of water. The vessel is evacuated and 2000 parts of sulfur dioxide is admitted. The vessel is then pressured to 750 lb./sq. in. with ethylene and is agitated for four hours at 24° C. The resulting graft copolymer film shows a weight gain of 145%. It is clear, smooth, colorless, tough, and stiff. It has a zero strength temperature above 250° C., a tensile strength of 4,709 lb./sq. in., an elongation of 89% when extended at the rate of 100% per minute, and a modulus in tension of 109,000 lb./sq. in. The corresponding values for a similar film of polyethylene that has been similarly irradiated but not treated with a mixture of ethylene and sulfur dioxide are zero strength temperature 174° C., tensile strength 3,046 lb./sq. in., elongation of 440%, and modulus in tension 18,000.

The process of this example is repeated and a graft copolymer film with a weight gain of 157% is obtained. The sulfur content is 21.4%. The calculated sulfur content for a 1/1 ethylene/sulfur dioxide graft at this weight gain is 21.1%.

Zero strength temperature is determined on a strip of film apprroximately one-half inch wide which is fastened at one end and draped over a metal bar approximately one inch in diameter which is equipped with an electric heating element. A weight corresponding to 10 lb./sq. in. of cross section of the film is attached to the free hanging end of the strip. The temperature of the bar is raised at a rate of about 2° C. per minute and the temperature at which the free end of the strip breaks and falls away is recorded as the zero strength temperature.

EXAMPLE V

A film of low density polyethylene, 0.0015 in. thick and weighing 26 parts, is placed in a pressure vessel. The vessel is evacuated and cooled to −78° C. Sulfur dioxide (300 parts) is added and the vessel is pressured to 600 lb./sq. in. with ethylene. The vessel is then irradiated at 25° C. for 20 minutes with an X-ray beam from a 3 mev. Van de Graaff accelerator in a position where ferrous sulfate dosimetry shows an energy absorption of 3000 rads/minute. The film is removed from the container and a light adhereing coating of ethylene polysulfone homopolymer is brushed away. The resulting graft copolymer film is clear and strong and shows a weight gain of 44.9%.

EXAMPLE VI

A film of crystalline polypropylene, 0.0005 in. thick and weighing eight parts, is wrapped in aluminum foil as in Example III and irradiated at −78° C. with 2 mev. electrons to a dosage of 50 M rads. The film is then transferred to a pressure vessel at −78° C. as in Example IV, the vessel is evacuated, 500 parts of sulfur dioxide is admitted, and the vessel is pressured to 1100 lb./sq. in. with ethylene. The vessel is then agitated for six hours at 25° C. The resulting graft copolymer film of ethylene polysulfone on polypropylene is clear and shows a weight gain of 12.9%.

EXAMPLE VII

The proces of Example VI is repeated using a 0.001 inch film of polyvinyl fluoride in place of the polypropylene. The resulting graft copolymer film of ethylene polysulfone on polyvinyl fluoride shows a weight gain of 10.3%.

EXAMPLE VIII

A nylon film, 0.002 inch thick and weighing 51 parts, is wrapped in aluminum foil as in Example III and irradiated at −78° C. with 2 mev. electrons to a dosage of 25 M rads. The film is removed from the aluminum foil and within a few seconds immersed in a solution of 100 parts of water in 7500 parts of allyl alcohol at −50° C. An excess of sulfur dioxide is bubbled slowly into this solution. While the sulfur dioxide is being passed in, the solution is allowed to warm to 25° C. during one hour and held at 25° C. for an additional five hours. The resulting graft copolymer film of hydroxymethylethylene polysulfone on nylon is removed, rinsed with acetone, and dried. It is unchanged in physical appearance and shows a weight gain of 9.2%.

EXAMPLE IX

The process of Example VIII is repeated using a film of low density polyethylene in place of the nylon. The resulting graft copolymer film shows a weight gain of 89.2%.

EXAMPLE X

A skein of polyethylene in the form of a three-dimensional, continuous, unitary, longitudinally extended plexus having one dimension of less than one micron, and being substantially without free ends, weighing 133 parts (Sample A), and a skein of polyethylene of the same type which has been drawn to twice its original length, weighing 47 parts (Sample B), are wrapped separately in aluminum foil as in Example III and irradiated at −78° C. with 2 mev. electrons to a dosage of approximately 40 megarads within a period of 40 minutes. The two skeins are kept at −78° C. while they are removed from the aluminum foil and placed togethre in a pressure reactor that has been flushed with nitrogen and cooled at −78° C. The reactor is closed, 500 parts of sulfur dioxide is admitted, and the reactor is then pressured to 1000 lb./sq. in. with ethylene. It is allowed to stand for two days at room temperature. The skeins of graft copolymer are removed. Sample A shows a weight gain of 14.6% and a zero strength temperature of 246° C. compared to a zero strength temperature of 156° C. for a similar fiber exposed only to the electron irradiation. Sample B shows a weight gain of 33%.

EXAMPLE XI

A skein of undrawn polyethylene in the form of Sample A in Example X (Sample C) is carefully degassed under nitrogen and wrapped in aluminum foil under a flow of nitrogen. Two pieces of polypropylene taffeta fabric (Samples D and E) are placed in separate aluminum foil envelopes and pressed to exclude air. Sample C weighs 79 parts, Sample D weighs 98 parts, and Sample E weighs 94 parts. The three samples are irradiated with 2 mev. electrons at −78° C. for a dosage of about 20 megarads within a period of 20 minutes. While maintained at −78° C., the samples are removed from the aluminum foil envelopes and transferred to a pressure vessel which has been swept with nitrogen and cooled to −78° C. Sulfur dioxide (500 parts) is introduced into the pressure vessel, which is then pressured under 950 lb./sq. in. with ethylene, sealed, and allowed to stand for 18 hours at room temperature. The samples are removed from the pressure vessel. Sample C shows a weight gain of 46% and a sulfur analysis of 10.47%. The theoretical sulfur content for a 46% weight increase in a graft of ethylene polysulfone onto polyethylene is 10.4%. Samples D and E of graft copolymer fabrics are stiffer and less translucent than the taffeta starting materials and do not melt when touched with a lighted cigarette; whereas, the starting material is easily burned.

EXAMPLE XII

A sample of polyethylene in the form of Sample A in Example X and weighing 41 parts (Sample F) and two samples of polypropylene taffeta, weighing 43 parts each (Samples G and H), are sealed in separate evacuated glass containers and irradiated at −78° C. with 2 mev. electrons. Sample F is given a dosage of 20 megarads within 20 minutes. Sample G is irradiated at −78° C. with 2 mev. electrons for a dosage of five megarads within five minutes, and Sample H is correspondingly irradiated for a dosage of 20 megarads within 20 minutes. The glass containers of all three samples are then opened to a supply of a gaseous mixture of ethylene and sulfur dioxide at atmospheric pressure and allowed to stand in contact with this mixture at room temperature for 18 hours. The containers are then opened. The graft copolymer from Sample F shows a weight increase of 3.3%. The graft copolymers from Samples G and H show weight gains of 1% and 1.6%, respectively.

EXAMPLE XIII

Two samples of polypropylene taffeta fabric, weighing 98 parts and 109 parts, respectively (Samples I and J), and a skein of high density polyethylene monofilament fiber, weighing 17 parts (Sample K), are wrapped in aluminum foil and irradiated at −78° C., with 2 mev. electrons to a dosage of 20 megarads within 20 minutes. The samples are kept at −78° C. and transferred to a pressure vessel which has been flushed with nitrogen and cooled to −78° C. Sulfur dioxide (500 parts) is added. The vessel is pressured to 1000 lb./sq. in. with ethylene for 60 hours at room temperature. Samples I and J both show weight increases of 78%. Sample K shows a weight increase of 56%. The graft copolymer from Sample I shows a sulfur content of 14.1%; the calculated value is 14.0%. The graft copolymer from Sample K shows a zero strength temperature of 200° C. as compared to a zero strength temperature of 106° C. for a similar skein of polyethylene monofilament similarly irradiated but not exposed to a mixture of sulfur dioxide and ethylene. Samples I and J show greatly increased dyeability over ungrafted polypropylene fabric when dyed with a disperse dye ("Latyl blue") and a basic dye (Victoria green). The dyes on the graft copolymer fabrics are stable to laundering.

EXAMPLE XIV

A sample of a nylon fabric bearing a 5 mil coating of polyethylene and weighing 171 parts (Sample L) and two samples of cotton fabric bearing approximately a 3 mil coating of polyethylene and weighing 375 and 340 parts, respectively (Samples M and N), are wrapped in aluminum foil and irradiated with 2 mev. electrons in the manner of Example III. Samples L and M are given dosages of 20 megarads each and Sample N is given a dosage of 2 megarads. The irradiated samples are transferred to a cold pressure vessel in the manner of Example XIII, pressured with a mixture of sulfur dioxide and ethylene, and allowed to stand for 18 hours at room temperature. The graft copolymer from Sample L shows a weight gain of 43%. The graft copolymers from Samples M and N show weight gains of 20% and 45%, respectively.

EXAMPLE XV

To illustrate the profound effect that rigorous exclusion of air has upon the amount of reaction that is obtained a film of low density polyethylene, 0.0015 inch thick and weighing 24 parts, is wrapped in 1-mil aluminum foil and irradiated at −78° C. with 2 mev. electrons to a calculated dosage of 25 M rad. It is then transferred to a pressure vessel at −78° C., 200 parts of deionized, de-aerated water is added, the vessel is evacuated, and 8000 parts of sulfur dioxide is distilled in. The vessel is then pressured to 300 lb./sq. in. with ethylene and evacuated (to the vapor pressure of the sulfur dioxide) three times, and it is then allowed to warm to room temperature and agitated for four hours at 25° C. under 700 lb./sq. in. ethylene pressure. The resultant graft copolymer film shows a weight gain of 505%. Its linear dimensions have increased 140-160%, its area 250%, and its volume 350%. It has a density of 1.4, a tensile strength of 11,000 lb./sq. in., an elongation of 20%, and a modulus in tension of 330,000 lb./sq. in.

EXAMPLE XVI

The process of Example XV is repeated, except that the electron irradiation dosage is only 1.25 M rad. The final product has a weight gain of 230%.

EXAMPLE XVII

A film of low density polyethylene, 0.0015 inch thick, is wrapped in 1-mil aluminum foil and irradiated at −78° C. with 2 mev. electrons to a dosage of 25 M rad. It is then immersed in water through which ethylene and sulfur dioxide are bubbled for four hours at 25° C. and atmospheric pressure. The weight gain is 4.3%. The film exhibits a marked increase in receptivity for the acetate dye, "Celanthrene" Brilliant Blue FFS and "Acetamine" Scarlet B over the untreated film.

EXAMPLE XVIII

A film of crystalline polypropylene, 0.002 inch thick and weighing five parts, is wrapped in aluminum foil, as in Example III, and irradiated at −78° C. with 2 mev. electrons to a calculated dosage of 3 M rad. The film is then transferred to a pressure vessel at −78° C., said vessel containing a plug of glass wool to prevent contact of the film with liquid monomer. The vessel is closed and evacuated. Sulfur dioxide (100 parts) and butadiene (50 parts) are bled in and the temperature of the vessel raised to 35° C. for one hour. Volatiles are vented and the film removed immediately. The resultant graft copolymer film shows a weight gain of 133%.

EXAMPLE XIX

Two taffeta fabrics made from (34 filament, 70 denier) crystalline polypropylene yarn and weighing 12 parts each are irradiated with 2 mev. electrons in nitrogen at −78° C. for a total dosage of 10 and 20 M rad, respectively. The fabrics are then contacted with a mixture of sulfur dioxide (250 parts) and ethylene (900 lbs./in.$^2$) in a pressure reactor and agitated at 26° C. for 14 hours. The fabrics are then scoured by washing in a conventional mechanical washing machine for 45 min. at 60° C. in 0.5% aqueous detergent solution. After scouring the weight gains of the dried fabrics are 212% and 300%, respectively.

EXAMPLE XX

Two crystalline polypropylene taffeta fabrics are irradiated with 2 mev. electrons for a total dosage of 10 and 20 M rad, respectively, as described in Example XIX. The fabrics are then contacted with a mixture of sulfur dioxide (1500 parts) and ethylene (900 lbs./in.$^2$) in a pressure reactor and agitated at 26° C. for 11 hours. After scouring as above the weight gains of the dried fabrics are 1.4% and 3.3%, respectively.

EXAMPLE XXI

A pile of 25 crystalline polypropylene taffeta fabrics are irradiated with 3 mev. electrons for a total dosage of 6 M rad as described in Example XIX. The fabrics are then contacted with a mixture of sulfur dioxide (500 parts) and ethylene (700 lbs./in.$^2$) in a pressure reactor and agitated at 23° C. for 6 hours. After scouring as above the average weight gain of the dried fabrics is 180%.

Yarn and fabric properties are evaluated on a particular fabric from Example XXI having a loading of 160% of grafted ethylene polysulfone. The grafted fabric shows a markedly improved resistance to hole melting, as in contact with a burning cigarette, over the ungrafted starting fabric. The grafted fabric is also readily dyed with basic, disperse and vat dyes. These dyeings have a surprising degree of washfastness whereas the ungrafted starting fabric is not dyeable with these dyes. Results are shown in Tables 1 and 2 which follow.

Table 1
YARN PROPERTIES OF POLYPROPYLENE MODIFIED WITH 160% ETHYLENE POLYSULFONE

| Property | Modified Polypropylene | Polypropylene Control |
|---|---|---|
| Tenacity (grams/denier) | 1.2 | 5.1. |
| Percent Elongation at break | 25 | 34. |
| Percent Tenacity loss at 100° C | 36 | 44. |
| Dyeability | See Table 2 | None. |
| Resistance to hole melting [1] | Improved | None. |
| Oxidative stability (Tb)$_{50}$ [2] | 172 hrs | 100 hrs. |

[1] By hot cigarette ashes.
[2] Tb$_{50}$=half life of tenacity at break; samples heated in forced air oven at 100° C.

Table 2
DYEABILITY [1] EVALUATION OF POLYPROPYLENE MODIFIED WITH 160% ETHYLENE POLYSULFONE [2]

| Dye Class and Color Index No. | Color Build-up (vs. 66 Nylon) | Washfastness Rating A.A.T.C.C. #3 | | Lightfastness, Hrs. to Break | |
|---|---|---|---|---|---|
| | | Test | 66 Nylon | Test | 66 Nylon |
| Basic Red 14 | 1 (S) | 2 W | 1 W | ~2 | none |
| Basic Blue 22 | 1 (S) | 3 W | 1 W | ~5 | ~5 |
| Disperse Blue 3 | 4 (S) | 4-3 W | 3 W | ~5 | ~40 |
| Vat Green 1 | 2 (S) | 4 W | 2 W | 20-40 | 20-40 |
| Vat Red 1 | 2 (W) | 4 W | 5-4 W | 20-40 | 10 |

[1] Dye—Rating Scale:
  Color Change: 5—none; 4—noticeable; 3—appreciable; 2—considerable; 1—very much.
  Color Build-up: S—stronger; W—weaker.
[2] Filaments are modified throughout the cross-section.

EXAMPLE XXII

A film of low density polyethylene, 0.0015 inch thick, is wrapped in one mil aluminum foil and irradiated at −78° C. with 2 mev. electrons to a dosage of 12.5 M rad. The film is then immersed in a solution of 40 parts of sulfur dioxide and 20 parts of butadiene in 100 parts of dimethoxyethane at atmospheric pressure and room temperature for 20 minutes. The resulting graft copolymer of butadiene polysulfone on polyethylene is washed with water, then washed with acetone, and dried. The weight gain in the grafting operation is 170%.

EXAMPLE XXIII

A molded polyethylene bottle, having a wall thickness of 0.030 to 0.040 inch and weighing 9.6 parts, is irradiated at −78° C. with 2 mev. electrons to a dosage of 25 M rads. The bottle is then transferred to a pressure vessel containing two parts of water and cooled at −78° C. The vessel is evacuated and 80 parts of sulfur dioxide is added by distillation. The vessel is then pressured with 300 lb./sq.in. of ethylene and evacuated (to the vapor pressure of the sulfur dioxide) three times. It is then agitated for four hours at 25° C. under 700 lb./sq.in. ethylene pressure. The resulting bottle shows a 45% increase in weight and a 21% increase in capacity. It is substantially stiffer than before the grafting operation. The permeability of the bottle to carbon tetrachloride and xylene at room temperature is about 5% of that of an ungrafted control bottle. When the grafted bottle is filled with mineral oil and heated in air at 100° C. for 48 hours, it is not distorted or substantially softened and the oil is not contaminated; whereas, an ungrafted control bottle softens, loses its shape and is partly dissolved in the hot oil. Examination of dyed cross sections of the grafted bottle shows that it is modified with ethylene polysulfone graft copolymer to a depth of about 0.005 inch.

EXAMPLE XXIV

A film of low density polyethylene is irradiated as in Example IV and then immersed in carbon disulfide at −30° C. A 1:1 mixture of ethylene and sulfur dioxide is bubbled through the carbon disulfide at atmospheric pressure for 2.25 hours at −30° C. The resultant graft copolymer of ethylene polysulfone on polyethylene shows a weight gain of 50%.

EXAMPLE XXV

A film of low density polyethylene, 0.0015 in. thick, is wrapped in aluminum foil and irradiated at 0° C. with 2 mev. electrons to a dosage of 1.25 M rads. The film is then immersed for ten minutes at 24° C. in a 80/2 mixture of sulfur dioxide/water under 700 lb./sq. in. ethylene pressure. The weight gain in the grafted product is 33%. The above process is repeated two times using 6.25 M rads exposure and 25 M rads exposure, respectively. The resulting corresponding weight gains are 102% and 162%.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process of forming a graft copolymer which comprises contacting a mixture of an olefin and sulfur dioxide with a preformed solid substrate of an organic polymer having a molecular weight of at least 5000 activated by irradiation with at least 100 rads of high energy ionizing radiation having a minimum energy of at least 100 ev.

2. The process of forming a graft copolymer which comprises activating a preformed solid substrate of an organic polymer having a molecular weight of at least 5000 by irradiating the same with at least 100 rads of high energy ionizing radiation having a minimum energy of at least 100 ev. and subsequently contacting the activated substrate with a mixture of an olefin and sulfur dioxide.

3. The process of forming a graft copolymer which comprises irradiating a preformed solid substrate of an organic polymer having a molecular weight of at least 5000 with at least 100 rads of high energy ionizing radiation having a minimum energy of at least 100 ev. while said substrate is in conact with a mixture of an olefin and sulfur dioxide.

4. The process of claim 1 wherein the high energy ionizing radiation is particle radiation.

5. The process of claim 4 wherein the high energy ionizing radiation is accelerated electrons.

6. The process of claim 1 wherein the high energy ionizing radiation is electromagnetic radiation.

7. The process of claim 6 wherein the high energy ionizing radiation is X-rays.

8. The process of forming a graft copolymer which comprises contacting a mixture of ethylene and sulfur dioxide with a preformed substrate of solid polyethylene activated by irradiation with at least 100 rads of high energy ionizing radiation having a minimum energy of at least 100 ev.

9. The process of forming a graft copolymer which comprises contacting a mixture of ethylene and sulfur dioxide with a preformed substrate of solid polypropylene activated by irradiation with at least 100 rads of high energy ionizing radiation having a minimum energy of at least 100 ev.

10. The process of forming a graft copolymer which comprises contacting a mixture of ethylene and sulfur dioxide with a preformed substrate of solid polyvinyl fluoride activated by irradiation with at least 100 rads of high energy ionizing radiation having a minimum energy of at least 100 ev.

11. The process of forming a graft copolymer which comprises contacting a mixture of ethylene and sulfur dioxide with a preformed substrate of a solid polyamide activated by irradiation with at least 100 rads of high energy ionizing radiation having a minimum energy of at least 100 ev.

12. The process of forming a graft copolymer which comprises contacting a mixture of butadiene and sulfur dioxide with a preformed substrate of solid polypropylene activated with at least 100 rads of high energy ionizing radiation having a minimum energy of at least 100 ev.

13. A graft copolymer comprising a preformed solid substrate of an organic polymer of a molecular weight of at least 5000 having chemically bonded thereto an olefin/sulfur dioxide polysulfone.

14. A graft copolymer comprising a preformed substrate of solid polyethylene having ethylene polysulfone chemically bonded thereto.

15. A graft copolymer comprising a preformed substrate of solid polypropylene having ethylene polysulfone chemically bonded thereto.

16. A graft copolymer comprising a preformed substrate of solid polyvinyl fluoride having ethylene polysulfone chemically bonded thereto.

17. A graft copolymer comprising a preformed substrate of a solid polyamide having ethylene polysulfone chemically bonded thereto.

18. A graft copolymer comprising a preformed substrate of solid polypropylene having butadiene polysulfone chemically bonded thereto.

19. A graft copolymer of claim 13 in the form of an article of manufacture.

20. A graft copolymer of claim 13 in the form of a fiber.

21. A graft copolymer of claim 13 wherein the polysulfone is ethylene polysulfone.

22. A graft copolymer of claim 13 wherein the polysulfone is butadiene polysulfone.

23. A graft copolymer comprising a preformed substrate of solid polyethylene having hydroxymethylene polysulfone chemically bonded thereto.

References Cited in the file of this patent
UNITED STATES PATENTS

| | | |
|---|---|---|
| 2,637,664 | Howe | May 5, 1953 |
| 2,882,290 | Coover et al. | Apr. 14, 1959 |
| 2,943,077 | Jong | June 28, 1960 |
| 2,956,899 | Cline | Oct. 18, 1960 |
| 2,976,269 | Jong | Mar. 21, 1961 |
| 2,999,056 | Tanner | Sept. 5, 1961 |

FOREIGN PATENTS

| | | |
|---|---|---|
| 213,169 | Australia | Feb. 18, 1958 |
| 809,838 | Great Britain | Mar. 4, 1959 |

OTHER REFERENCES

Brookhaven Nat. Lab., Report 367, pp. 27 and 28, February 1956.

UNITED STATES PATENT OFFICE
CERTIFICATE OF CORRECTION

Patent No. 3,170,892                February 23, 1965

Warren F. Busse

It is hereby certified that error appears in the above numbered patent requiring correction and that the said Letters Patent should read as corrected below.

Column 2, lines 25 to 27, the formula should appear as shown below instead of as in the patent:

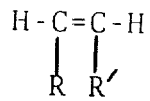

column 3, line 30, for "wherever" read -- whichever --; column 11, line 48, for "conact" read -- contact --.

Signed and sealed this 13th day of July 1965.

(SEAL)
Attest:

ERNEST W. SWIDER
Attesting Officer

EDWARD J. BRENNER
                                            Commissioner of Patents